United States Patent [19]

Doggett et al.

[11] Patent Number: 5,258,821
[45] Date of Patent: Nov. 2, 1993

[54] LASER BEAM PROFILER HAVING A MULTIMODE LASER DIODE INTERFEROMETER

[75] Inventors: David E. Doggett, Boulder Creek; Donald W. Wapenski, San Jose, both of Calif.

[73] Assignee: Photon, Inc., Santa Clara, Calif.

[21] Appl. No.: 511,564

[22] Filed: Apr. 20, 1990

[51] Int. Cl.⁵ .............................................. G01B 9/02
[52] U.S. Cl. ...................................... 356/345; 356/358; 356/121
[58] Field of Search ............... 356/358, 376, 213, 356, 356/121, 225, 345, 354, 357; 250/237 R

[56] References Cited

U.S. PATENT DOCUMENTS

| | | | |
|---|---|---|---|
| 4,160,598 | 7/1979 | Forester et al. | 356/121 |
| 4,383,757 | 5/1983 | Phillips | 250/201 |
| 4,530,603 | 7/1985 | Shaw et al. | 356/345 |
| 4,733,253 | 3/1988 | Daniele | 346/108 |
| 4,737,798 | 4/1988 | Lonis et al. | 346/1.1 |
| 4,807,992 | 2/1989 | Noguchi et al. | 356/121 |
| 4,817,098 | 3/1989 | Horikawa | 372/29 |
| 4,864,585 | 9/1989 | Hayashi et al. | 372/92 |
| 4,873,989 | 10/1989 | Einzig | 356/345 |
| 4,948,257 | 8/1990 | Kaufman et al. | 356/354 |

OTHER PUBLICATIONS

Spectral Profiling With A Single Photodiode, John M. Fleischer & David Doggett, Lasers & Optronics, Apr. 1989, p. 47.

*Primary Examiner*—Samuel A. Turner
*Attorney, Agent, or Firm*—Fliesler, Dubb, Meyer & Lovejoy

[57] ABSTRACT

A laser beam profiler having a movable member on which is mounted a means adapted to be moved through a laser beam for measuring the profile of the laser beam. The profiler comprises an interferometer which uses a multimode diode laser to generate a reference laser beam and a distance measuring laser beam. A retro-reflector is rigidly attached to the movable member and varies the path length of the distance measuring laser beam as the movable member is moved. A photodetector responsive to the reference laser beam and the distance measuring laser beam as said movable member is moved provides a frequency modulated output signal, said output signal having an envelope, the amplitude of which varies as a function of $\Delta l$, where $\Delta l$ is the difference in the path lengths of said reference and said distance measuring laser beams, said interferometer, including said movable member, being so arranged that the amplitude of said envelope of said output signal is maximum when $\Delta l$ is zero.

16 Claims, 8 Drawing Sheets

LASER BEAM PROFILER HAVING A MULTIMODE LASER DIODE INTERFEROMETER

BACKGROUND OF THE INVENTION

1. Field of the Invention

The present invention relates to laser beam profilers in general and in particular to a laser beam profiler which comprises a multimode diode laser optical interferometer that avoids problems caused by the use of a single mode diode laser where the laser will mode-hop and cause errors in the accuracy of the interferometer.

2. Description of the Prior Art

A laser beam profiler is an analytical instrument which is used for measuring the profile, i.e. dimensions, of a laser beam along one or more axes. In practice, a photodetector is used to detect the radiation from the laser as a knife-edge, slit, pinhole, or the like, is moved through the beam. In a preferred embodiment a knife-edge is used for measuring a small laser beam. The position of the knife-edge in the beam can be measured using an interferometer. The output of the photodetector and the interferometer are used in conjunction to provide an output corresponding to the measured laser beam profile.

Optical interferometers have been used in laboratory and industrial applications for many years. Interferometers are generally used where the amount of movement required is not large but the precision required for measuring the movement is great.

With the advent of the laser, interferometers became useful in a wide variety of applications including machine control and particularly in the semiconductor industry. The development of the diode laser, particularly the single mode diode laser which has a relatively long coherence length, further provided a laser source that is very attractive because of its low cost, compact size and low power requirements, thus making it useful in such devices as laser beam profilers.

While the single mode diode laser is attractive, it also has problems associated with it. One of the most difficult problems is the laser's tendency to mode-hop in the presence of power changes, temperature changes and possibly with natural aging of the device. Mode-hopping has also been observed in response to changes in the percentage of the laser's output radiation that is reflected back into the laser.

Various methods have been used in an attempt to stabilize the laser so that it does not mode-hop. For example, temperature control has been used in conjunction with methods to control the output power of the laser. The output power of the laser normally is controlled by use of a photodiode that monitors the output power and is connected, in conjunction with external electronics, to feed back a signal that restricts the output power to a predetermined level. Such a method used to control mode-hopping is taught in U.S. Pat. No. 4,817,098 to Horikawa entitled "Semiconductor Laser Divider System".

Even by employing means to control temperature and power, it cannot be assumed that the laser mode-hopping transition points will remain constant over the life of the device; and, therefore, it cannot be assumed that an interferometer will not have, some time in the future, an unstable point move into the region that has been preselected at an earlier point in time as being a stable point of operation. Tests have been performed where diode lasers have been aged for 2000 hours at 20° C. and have experienced changes in mode-hopping transition points.

Methods have been employed to produce an operating system that will function in the presence of mode-hopping where the power of the laser is toggled between a plurality of power levels in an attempt to find a point where mode-hopping does not occur and where an accurate measurement can be made. This method is useful when the designer is forced to avoid the added cost of temperature stabilization of the laser. In using this method the designer has to assume that, over the normal operating environments, by varying laser power, the laser will move into a temperature/power regime where mode-hopping will not occur. However, such a multiple-power level technique is undesirable for reasons in addition to its added complexity. Experience has shown that there are some single mode lasers that will mode-hop over a wide variation of power levels. Also, an interferometer that is designed to avoid mode-hopping by changing power levels has the additional problem of having to be designed to be accurate over a wide range of signal levels in its detection circuitry. Such a circuit would not be as accurate as a circuit that was controlled in power and optimized to be accurate at one power level. Finally, a circuit that requires the output to be changed to many various power levels in an attempt to find a stable power level also would require more time to make a measurement.

The problem of mode-hopping is twofold. One problem is that the actual change in frequency of the light causes the distance between interference fringes to change and, therefore, the accuracy of the measurement made with the interferometer to degrade. The second problem is that mode-hopping generally entails a change in the optical output power (a mode-hopping noise signal) that changes the accuracy of the interferometer and decreases its effectiveness.

Several other patents have issued which deal with the problem of mode-hopping, including U.S. Pat. No. 4,807,992 to Noguchi et al entitled "Method of Detecting Semiconductor Laser Mode-Hopping and Semiconductor Laser Beam Source Apparatus"; U.S. Pat. No. 4,733,253 to Daniele entitled "Apparatus and Method for Detecting and Eliminating Diode Laser Mode-Hopping"; and U.S. Pat. No. 4,737,798 to Lonis et al entitled "Laser Diode Mode-Hopping Sensing and Control System".

SUMMARY OF THE INVENTION

In view of the foregoing, a principal object of the present invention is a laser beam profiler comprising an interferometer that does not exhibit the sensitivity with respect to temperature or power output of the single mode diode laser and yet allows precise measurement of very small movements. This is accomplished by using a diode laser that has heretofore been deemed unacceptable for use in a laser interferometer because of the multiple longitudinal modes in which it operates. Such a multiple longitudinal mode laser can be used in a system that is designed to have a restricted movement and further can be used in a system that has an even wider movement range if the point of zero path length differences of the two legs of the interferometer occur in the center of travel of the measurement range.

The useful range of the interferometer that utilizes the multi-longitudinal mode diode laser in accordance with the present invention can be further enhanced if the moving leg of the interferometer is made to move in a nearly sinusoidally varying manner around the point of zero path length difference.

A further object of the present invention is a compensation circuit which is connected to receive the signal from the interferometer detector and compensate for the drop-off in the interference modulation signal due to a decrease in coherence of the interfering radiation.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

Figure 1:
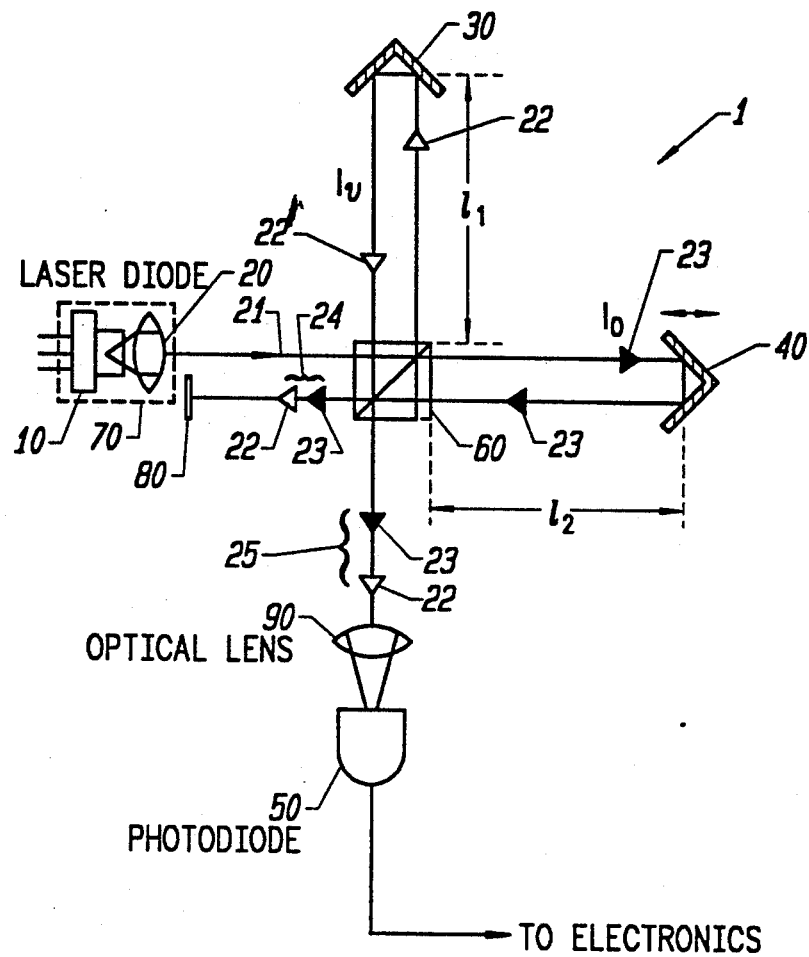
FIG. 1 is a drawing of a prior art single mode laser interferometer with its component parts.

Referring to FIG. 1, there is shown a diagram of a Michelson diode laser interferometer designated generally as 1. In the interferometer 1 there is provided a laser assembly 70 comprising a laser diode 10 which has its output radiation collimated by a lens 20. The output radiation, i.e. beam 21, goes to a beam splitter 60 and is split into two substantially equal beams, i.e. a beam 22 (empty arrow head) and a beam 23 (filled arrow head). Beam 22 is directed by splitter 60 toward a mirror 30 which is termed a retro-prism reflector and has the property that the beam entering the retro-reflector will be returned in the same direction that it came from, although it might or might not be displaced laterally depending upon where the input beam impinged upon the reflecting surfaces. The use of this retro-reflector will be described in more detail subsequently. The other half of the beam, beam 23, is directed toward a retro-reflector 40 which has the same operation as the previously described retro-reflector 30. The two beams 22 and 23 that are reflected from retro-reflector 30 and 40 are returned to the cube beam splitter 60 and those beams are combined and in turn divided into two different sets 24 and 25 of beams 22, 23. One set 24 of beams 22, 23 is directed back in the direction of the laser 10 and collimator lens 20. The set 24 of beams 22, 23 is stopped by an opaque beamstop 80. The other set 25 of beams 22, 23 is directed through a focusing lens 90 toward a detector 50. The use of focusing lens 90 is optional and its omission will not affect the operation of the interferometer other than requiring detector 50 to be larger in size. The two beams 22, 23 in set 25 are sensed by detector 50 and together with electronics (not shown) produce an output signal.

If retro-reflector 30 and retro-reflector 40 are adjusted together with beam splitter 60 so that the two beams 22, 23 in set 25 directed toward detector 50 are superimposed, have nearly the same path length and have the same direction, then interference will occur at detector 50. If such an adjustment is carefully carried out, the two beams will interfere and produce an output from detector 50 in proportion to the interference of the two beams of light. If either mirror 30 or 40 is moved in a direction along the path of the laser beams in such a way as to change the path length of the radiation in one leg or the other of the interferometer, the output intensity at the detector will change in response to such a movement. Such a change in output is shown in FIG. 2.

Figure 2:
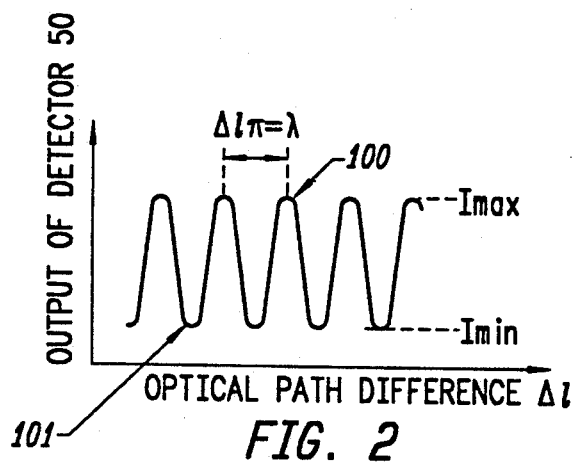
FIG. 2 is a representation of the output signal of a detector produced by the interferometer of FIG. 1.

Referring to FIG. 2, where the optical path difference $\Delta l$, where $\Delta l = [2(l_2 - l_1)]$ as seen in FIG. 1, is a multiple of a wavelength, constructive interference will produce a maximum output from detector 50 as at point 100. Where $\Delta l$ is a multiple of a half wave length, destructive interference will produce a minimum output from detector 50 as at point 101.

The amount of variation in detector signal output from its minimum to its maximum is a function of the quality of the optics used, the precision of the alignment of the system and the coherence of the laser source.

Figure 3A:
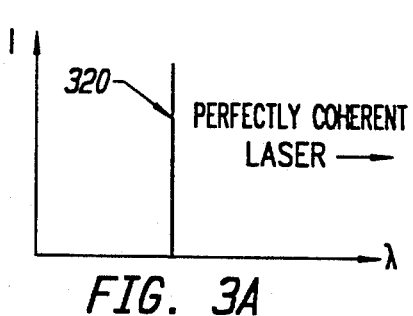
FIGS. 3A and 3B are drawings of the wavelength $\lambda$ and output of an interferometer detector comprising a perfectly coherent single mode laser.
Figure 3B:
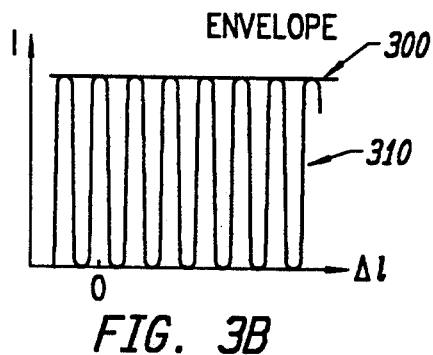

Referring to FIGS. 3A and 3B there is shown an envelope (300) of an interference signal (310) for a perfectly coherent laser having a single wavelength 320. This laser would exhibit coherence no matter how large a difference exists between the two paths $l_1$ and $l_2$ (FIG. 1) and is therefore considered to have an infinite coherence length. However, single mode diode lasers are not perfectly coherent. They have sideband modes which in an interferometer would produce an interference envelope 410 as shown in FIGS. 4A and 4B.

Figure 4A:
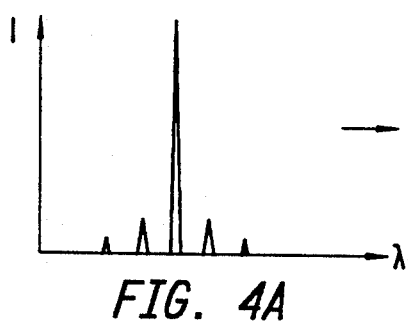
FIGS. 4A and 4B are drawings of the wavelengths $\lambda$ and output of an interferometer detector comprising a typical single mode diode laser.
Figure 4B:
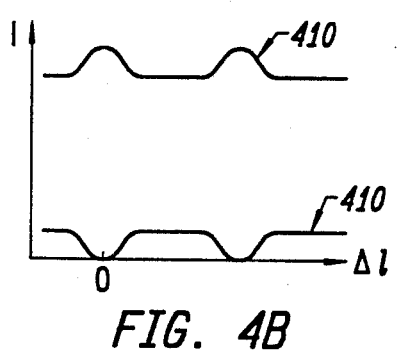

In FIG. 4A sideband modes are considerably suppressed but the laser is not perfectly coherent. The envelope 410 of the interference shows a decrease in modulation depth when $l_1$ and $l_2$ are not equal but even with a considerable path length difference the envelope is still substantial. This fact has led to the use of single mode diode lasers in many interferometry applications including laser beam profilers.

As indicated above, however, the single mode laser is prone to mode-hops. Such a phenomenon is explained in detail in U.S. Pat. No. 4,864,585, entitled "External Cavity Type Semiconductor Laser Apparatus", issued to Hayashi et al. While their treatment of the phenomenon is excellent, it must be noted that in practical experience the mode-hops of diode lasers are not as simple and as equally spaced as the reader would assume from the Hayashi teaching.

Practical diode lasers, i.e. components procured from manufacturer's stock, exhibit many different types of mode-hopping and mode-hopping noise. A laser spectrum analyzer can be employed to analyze the spectrum of commercial diode lasers and it will be found, for instance, that some lasers will hop two modal spacings or more instead of one. There are also lasers that rapidly jump back and forth between adjacent modes. There are lasers that are single mode at low power and then become multimode at moderate power and then become single mode again at high power. There are also lasers that start lasing in two simultaneous modes where these modes are spaced two or three modes apart. A discussion of a diode laser spectrum analyzer is found in a paper by Doggett and Fleischer in *Laser and Optronics*, Apr. 1989, page 47.

Figure 5A:
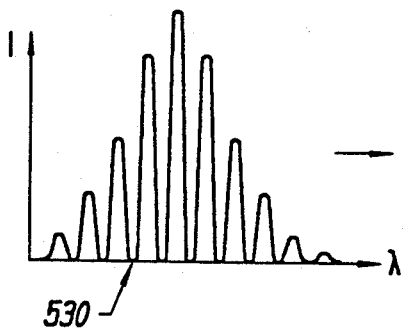
FIGS. 5A and 5B are drawings of the wavelengths $\lambda$ and output of an interferometer detector comprising a typical multimode diode laser.
Figure 5B:
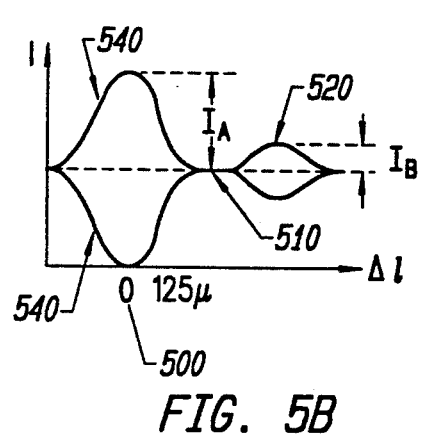

Referring to FIGS. 5A and 5B, some diode lasers are constructed in such a way as to have many modes lasing simultaneously. These lasers are termed multimode lasers. The mode pattern 530 as seen in FIG. 5A shows that this laser is producing several wavelengths of radiation simultaneously. The graph of the interference modulation envelope 540 in FIG. 5B shows maximum modulation at zero path length difference 500 and zero (or nearly zero) modulation at 510 where the path length difference is such that no interference between radiation from the two legs of the interferometer occurs at the detector. The output of such a laser for use in an interferometer traditionally is viewed as unacceptable because for even small interferometer path length differences ($l_1 - l_2$) the modulation envelope essentially goes to zero indicating that no interference is taking place. Therefore, there is no information concerning the movement of one of the retro-reflectors with respect to the other in the interferometer system.

In accordance with the present invention, however, it has been found that a multimode diode laser possesses at least two advantages over the nominally single mode diode lasers that are almost universally used in diode laser interferometers. The first advantage is that since several modes are lasing at the same time, there is not the tendency of the laser to have a radical mode shift at any particular power or temperature. The second advantage is that since there is no radical mode shift or mode-hop, there also are no points in the laser's power or temperature characteristics where noise associated with mode-hopping will occur.

As will be further described below, it has been found that in constructing an interferometer for the measurement of small distances, the multimode diode laser can be used to advantage in a laser beam profiler if care is taken in the adjustment of the optical system so as to maximize the relatively short distance over which the interference envelope is of sufficient magnitude to provide a usable interference signal.

As indicated above, if the interferometer is adjusted such that the path length difference at the center of motion of the profiler system is nearly zero and the movement of the retro-reflector in the movable leg is limited so that the modulation envelope does not go to zero, such a system together with appropriate electronics can produce an acceptable interferometry signal that is stable over temperature and time. As seen in FIG. 5B, the point 510 is a point where the modulation decreases to zero (or near zero); therefore, the interferometer swing should be limited to a portion of twice the distance from 500 to 510. For example, assuming that the interferometer has been adjusted so that the zero path length difference condition occurs in the center of the movement of the interferometer, i.e. at point 500, and the diode laser, e.g. a Sharp LT023 multimode diode laser, a typical relative movement of the interferometer legs of from 0 microns to $\pm 125$ microns about point 500 has been found to produce an acceptable output signal. Still larger excursions may be used with the LT023 or other multimode lasers using suitable signal processing electronics.

Figure 6:
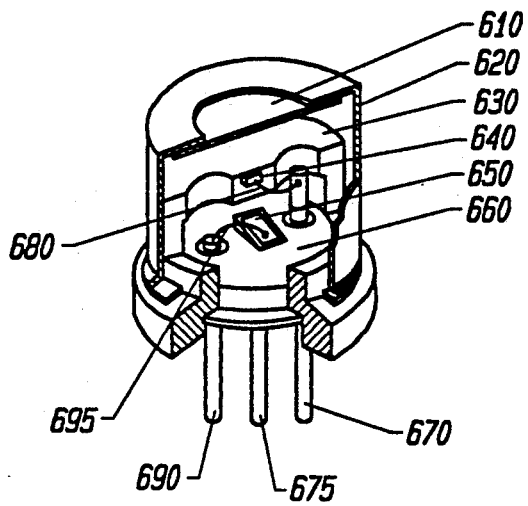
FIG. 6 is a partially cutaway view of a typical low cost diode laser mount.

A laser diode 640 of the type applicable for use in the interferometer of the beam profiler of the present invention is shown in outline in FIG. 6. The laser diode 640 is attached to a heat sink 630 which is thermally connected to a heat sink 660. An electrical connection is made from a lead 670 to the laser 640 via a connection wire 680. Return current is carried through lead 675, typically connected to the diode laser case. Radiation that is emitted from the rear facet of the laser diode is captured by a photodetector 650 which is connected to lead 690 via a connection wire 695 to provide a monitor of the radiation that exits the laser through its front facet and thence exits the case 620 through window 610. Such a laser is available from a variety of manufacturers, e.g. Sharp Electronics, Japan.

Figure 7:
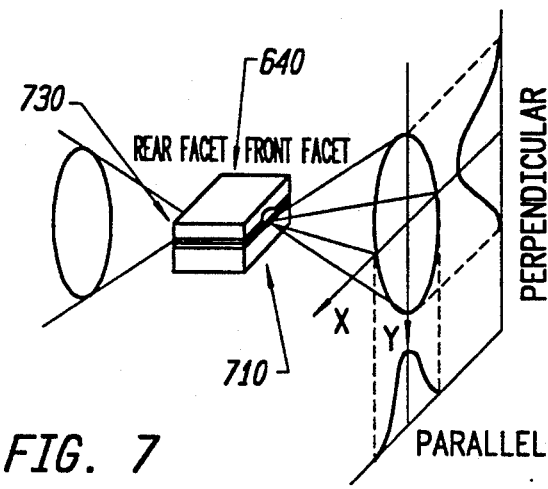
FIG. 7 is the typical radiation pattern from a diode laser.
Figure 8:
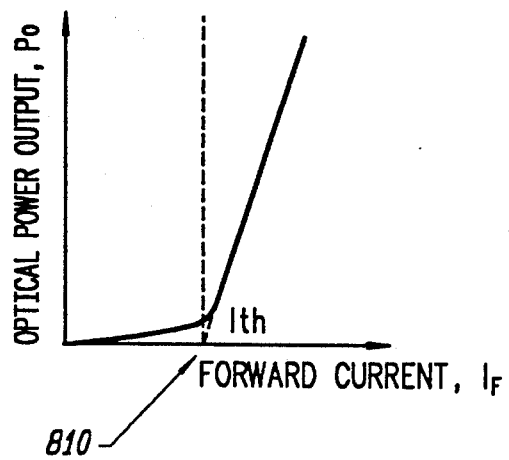
FIG. 8 is a graph of optical output power vs. diode laser current.

The laser diode chip 640 of FIG. 6, is shown in more detail in FIG. 7 and consists of a small semiconductor device made of various dopings of gallium arsenide which emits radiation from a front and rear facet 710 and 730, respectively. Radiation from front facet 710 is shown in FIG. 7 as being elliptical in nature. The radiation from rear facet 730 is also nominally elliptical and is intercepted by the photodetector 650 (FIG. 6) for providing an indication of the radiation exiting from the front facet 710. The output radiation is related to the input current as shown in FIG. 8. As can be seen from FIG. 8, there is very little radiation emitted until a current level, termed Threshold Current (Ith), 810 is reached. At that point, output radiation increases rapidly with increasing current.

Figure 9:
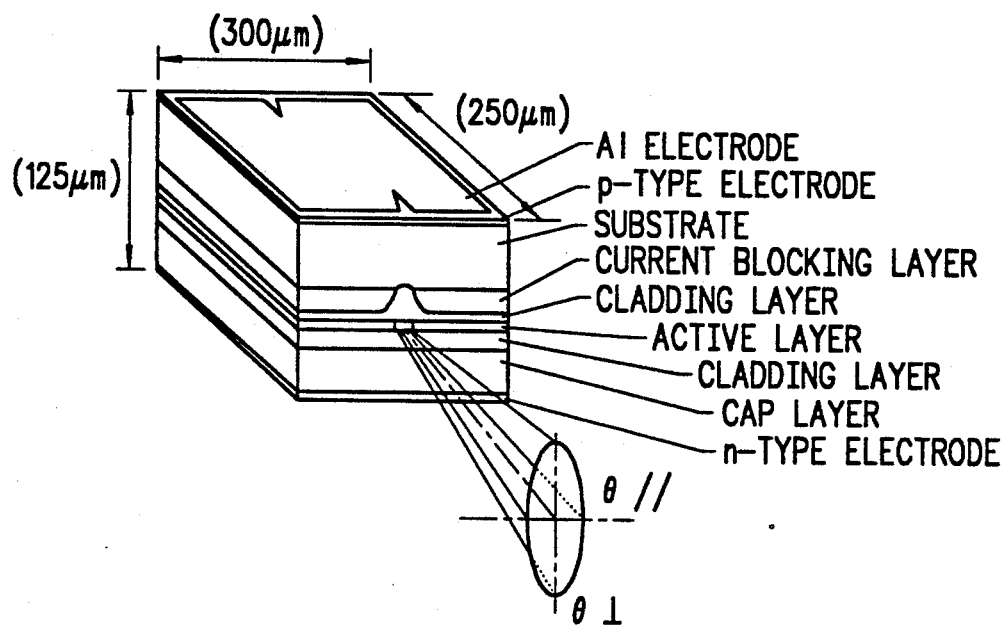
FIG. 9 is a drawing of the structure of a commercial diode laser.

The general structure of a multimode diode which can be used in an interferometer according to the present invention can be seen in still more detail in FIG. 9. As seen in FIG. 9, this structure, which in this representation is a VSIS structure manufactured by Sharp Electronics, is composed of gallium arsenide with various layers that have different levels of doping. Typically, the laser is 250 microns long, 300 microns wide and 125 microns thick. The length of the laser diode, which here is nominally 250 microns, is directly related to the amount of path length difference that the interferometer legs can exhibit before the modulation intensity reaches a minimum. Therefore, the amount of movement that is desired in an interferometer utilizing a multimode laser diode will be determined in part by the distance between the front and rear facet of the laser diode (which is the length of the laser diode chip).

It is desirable to utilize laser diodes of standard length which can be purchased at low cost from a variety of vendors. Measurements were made in an interferometer constructed by using a multimode laser diode as described above and it was found that movements on the order of 65 microns could be achieved with only a nominal decrease in the interference modulation envelope. As indicated above, however, larger movements can be measured with a greater decrease in the interference modulation envelope so long as the decrease in the interference modulation envelope does not prevent the detection of the interference fringes.

Figure 10:
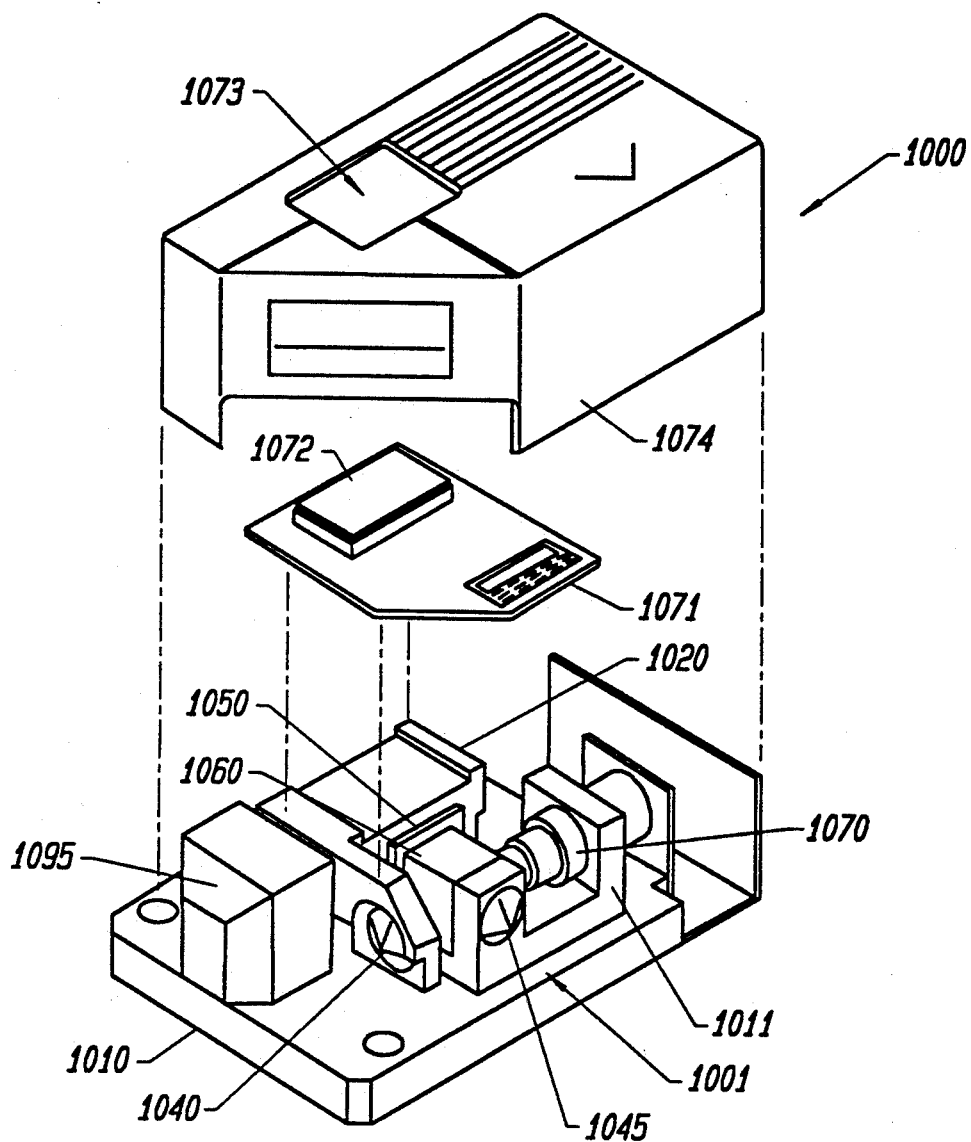
FIG. 10 is an exploded view of a laser beam profiler according to the present invention.
Figure 11:
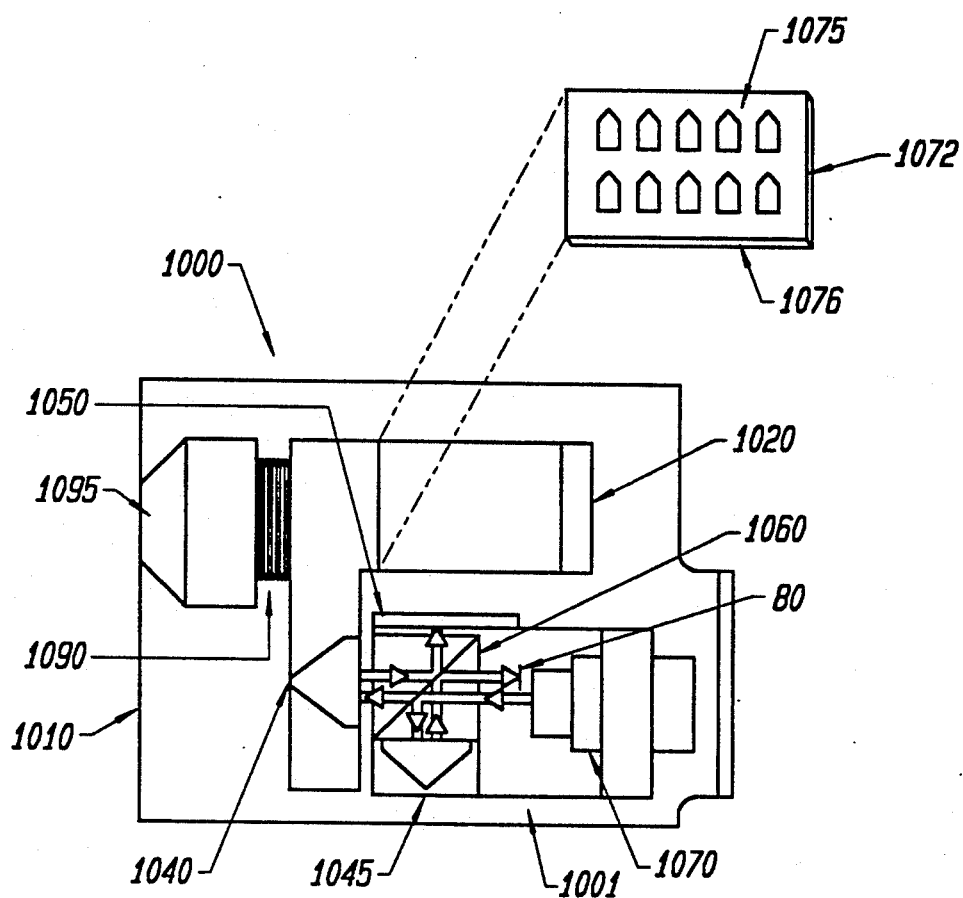
FIG. 11 is a partial top plan view of the profiler of FIG. 10.
Figure 12:
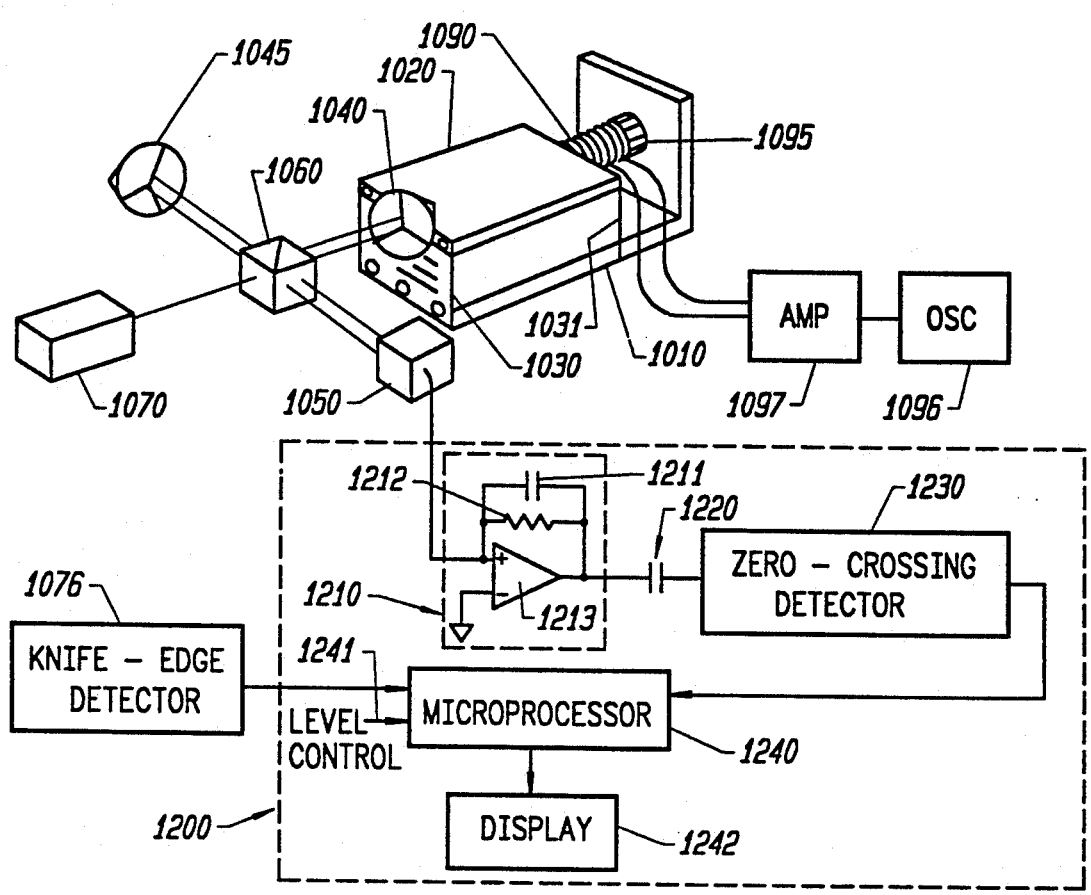
FIG. 12 is a simplified drawing showing a multimode laser diode interferometer according to the present invention.

Referring to FIGS. 10, 11 and 12, there is provided in accordance with the present invention a laser beam profiler 1000 comprising a multimode diode laser interferometer designated generally as 1001. In the interferometer 1001 there is provided a pair of retro-reflectors 1040 and 1045 that serve as the mirrors in each of the legs of a Michelson interferometer. Each of the retro-reflectors 1040, 1045 is a three surface mirror that can be either solid, where the reflective surfaces are external, or hollow, where the surfaces are comprised of three front surface mirrors precisely aligned, so that the radiation entering the assembly is returned in the same direction it came from. Such a retro-reflector, called a corner cube retro-reflector, can be purchased from Mills Griot, Irvine California, Part No. 02CCG001. Although the retro-reflectors in FIG. 1 are drawn as having only two surfaces, the preferred embodiment is that of a three-surface retro-reflector.

As seen more easily in FIG. 12, which is a simplified diagram of the interferometer 1001, retro-reflector 1040 is mounted rigidly to a movable table 1020 which, in the preferred embodiment, is supported by two leaf spring members 1030 and 1031 attached to the ends thereof. Alternately, table 1020 could be constructed using linear ball bearings or any other method that would produce smooth low friction movement of the table. The members 1030 and 1031, which comprise two pieces of 0.004Δ beryllium copper, are in turn mounted to a base member 1010. The interferometer 1001 has a multimode diode laser illumination source 1070 which sends light through a beam splitter 1060. The light is split into two beams and one beam goes to retro-reflector 1040 and the other beam to retro-reflector 1045. These beams are reflected back through beam splitter 1060 to combine and cause interference on a detector 1050. The source 1070, beam splitter 1060, detector 1050 and reflector 1045 are rigidly attached to the base member 1010 by means of a mounting bracket assembly 1011.

The movement of table 1020 is produced by a coil 1090 which moves in a magnetic field produced by a magnet 1095 which is rigidly attached to the base 1010. The coil is driven at a frequency that is controlled by an oscillator 1096 which is fed through an amplifier circuit 1097 to drive coil 1090.

Figure 13:
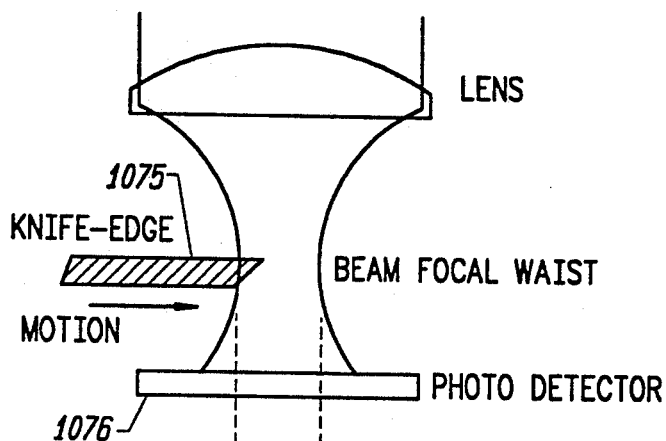
FIG. 13 is a diagram showing movement of a knife-edge through a beam for measuring the profile of the beam.

In FIG. 10, attached to the top of the table 1020 there is provided, in the preferred embodiment, a knife-edge plate and photodetector assembly 1071 comprising a knife-edge plate 1072 which is accessible to a laser beam, the profile of which is to be measured, through a window 1073 provided therefor in a cover 1074. The plate 1072 comprises chrome deposited on a thin plate of soda-lime glass. As seen more clearly in FIG. 11, an array 1075 of knife-edge patterns, i.e. windows, known as houses due to their shape, are photoetched into the chrome. The glass plate 1072 is mounted directly above a photodetector 1076 as shown schematically in FIG. 13. Alternately, profiler plates using pinholes or slits may also be used. Indeed, both may be constructed without the glass substrate as a support member. It is common practice in the art of beam profilers to use metal foil that has slit or pinholes which are laser cut, chemically etched or otherwise formed in the foil.

Figure 14:
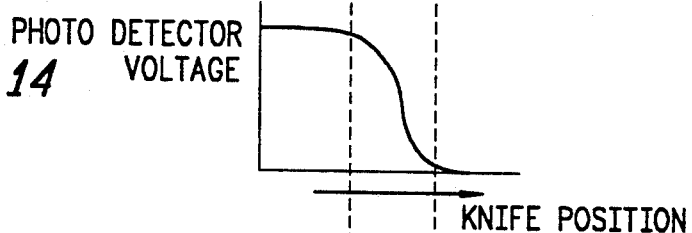
FIG. 14 is a diagram of the output of a photodetector used for detecting the laser beam of FIG. 13.
Figure 15:
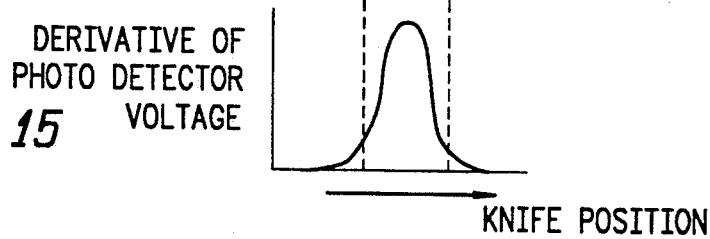
FIG. 15 is a diagram of the derivative of the photodetector voltage of FIG. 14.

Referring to FIGS. 13–16, as the table 1020 is moved in one direction by coil 1090 and magnet 1095, one of the knife-edges intercepts the beam which is to be measured, producing an output from the detector 1076 as shown in FIG. 14. The output of the detector 1076 is then differentiated to provide the beam profile shown in FIGS. 15 and 16. The output of the detector 1076 and a digitized version of the output of the detector 1050 from the interferometer are then compared to provide a measure of the width of the beam at a predetermined amplitude, e.g. 50% of the maximum amplitude.

In practice, the table 1020 is driven by the coil 1090 and magnet 1095 in a sinusoidal manner and therefore has a substantially sinusoidal varying velocity which decreases as the maximum excursions both toward the beam splitter 1060 and away from the beam splitter 1060 are reached. The rate of change in the movement of table 1020, and consequently retro-reflector 1040, produces a change in the frequency of the interference modulation signal which corresponds to the changing velocity of the leaf spring-mounted table 1020.

In practice, the interferometer of the present invention is adjusted so that a zero path length difference between the two legs of the Michelson interferometer occurs when the table is at its midpoint position.

Figure 17:
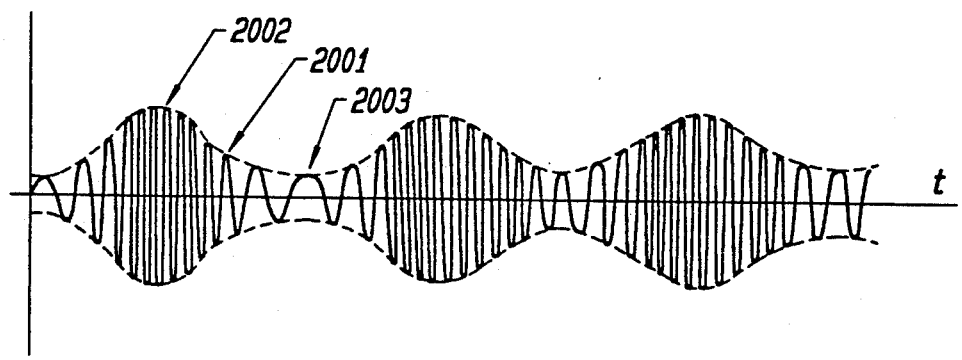
FIG. 17 is a representation of the frequency modulated and amplitude modulated interference signal obtained from the interferometer of FIGS. 10-12.

Referring to FIG. 17, there is shown a diagram 2000 of the amplitude and frequency modulated output of the detector 1050. At the midpoint of the table's movement where the path length difference of the two legs of the Michelson interferometer is nearly zero, the velocity of the table, and consequently the corresponding frequency of the modulation signal are at their maximum as seen at 2002. At this point the size of the modulation envelope is also maximum. As the table is driven from this midpoint position either toward or away from the beam splitter 1060, the velocity of its travel decreases and correspondingly the frequency of the modulation decreases, as seen at 2003. The modulation envelope also decreases due to the short coherence length of the multimode diode laser.

Referring again to FIG. 12, the outputs of the interferometer detector 1050 and the knife-edge detector 1076 are coupled to a signal processing circuit 1200. To compensate for the decrease in the modulation envelope, the output of detector 1050 is provided to a compensation circuit comprising a transimpedance amplifier 1210 which is configured to be responsive to the frequency of the output of detector 1050. The transimpedance amplifier 1210 converts the current produced by diode 1050 to a voltage. In the preferred embodiment, the gain of operational amplifier 1213 is controlled by the complex impedance provided by resistor 1212, having a resistance of about 20K ohms, and capacitor 1211, having a capacitance of about 1000 P/. At low frequencies the gain is dominated by resistor 1212. At higher frequencies, the gain is rolled off by capacitor 1211. This roll-off of gain at higher frequencies allows the use of a larger resistor 1212 without causing the amplifier to oscillate due to lack of damping or to distort the signal due to overgain conditions. This, in turn, allows the transimpedance amplifier to "salvage" more of the signal produced on the photodetector.

Figure 16:
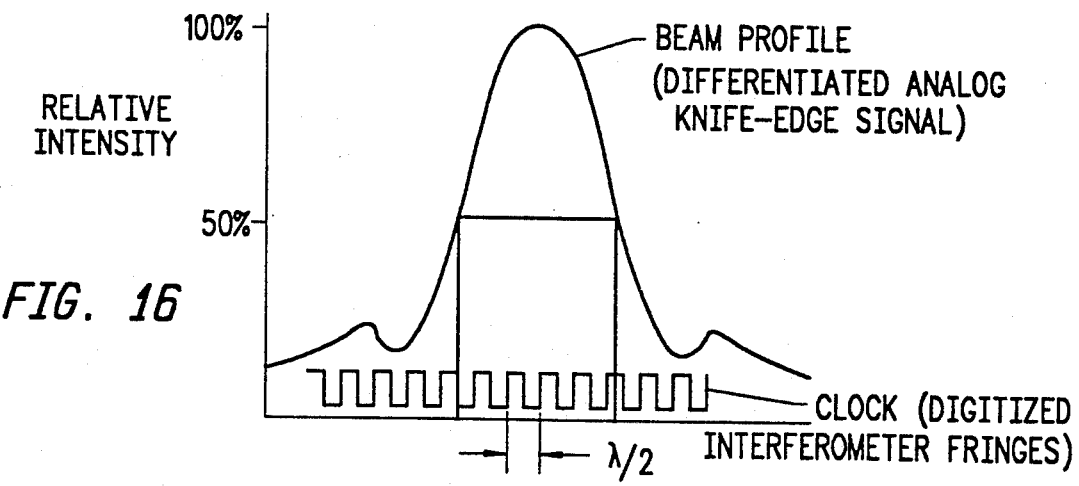
FIG. 16 is an enlarged view of the signal of FIG. 15 in combination with a digitized interferometer output.

The output of the transimpedance amplifier 1210 is then ac coupled by capacitor 1220 to a conventional zero crossing detector 1230. In operation, each zero crossing of the ac interferometer wave produced by diode 1050 and amplified by transimpedance amplifier 1210 produces a transition at the zero crossing detector's output. The output of the zero crossing detector 1230 is then compared with a digitized output of the knife-edge photodetector 1076 in a microprocessor 1240. A level control signal selected by the operator is provided to the microprocessor on a line 1241 to select the amplitude at which the output of the knife-edge photodetector 1076 is to be measured. For example, if the operator wishes to measure the profile of the beam at a level of 50% of its peak value as shown in FIG. 16, the level control is adjusted accordingly and produces an output corresponding to the selected measure of the profile of the beam being measured. The results, e.g. a number corresponding to the width of the beam at a selected point thereon, are then displayed on the display 1242.

While a preferred embodiment of the present invention is described above, it is contemplated that various modifications may be made thereto without departing from the spirit and scope of the present invention. Accordingly, it is intended that the embodiment described be considered only as an illustration of the present invention and that the scope thereof should not be limited thereto but be determined by reference to the claims hereinafter provided and their equivalents.

What is claimed is:

1. A laser beam profiler comprising:
    a movable member on which is mounted a means which is adapted to be moved through a laser beam to be measured for providing a profile output sign as a function of the profile of said laser beam as said profile output signal providing means is moved through said laser beam;
    an interferometer which incorporates a multimode diode laser to generate a reference laser beam having a fixed path length and a distance measuring laser beam, a reflective means which is rigidly attached to said movable member and which varies the path length of said distance measuring laser beam as said movable member is moved, and means responsive to said reference laser beam and said distance measuring laser beam as said movable member is moved for providing a frequency modulated output signal the frequency of which varies as the velocity of the movable member varies, said frequency modulated output signal having an envelope, the amplitude of which varies as a function of $\Delta l$ where $\Delta l$ is the difference in the path lengths of said reference and said distance measuring laser beams, and said interferometer, including said movable member, being so arranged that said amplitude of said envelope of said output signal is maximum when said movable member is at its midpoint position which corresponds to $\Delta l$ being zero; and
    means responsive to said profile output signal providing means and said frequency modulated output signal for providing an output signal corresponding to a selected measure of the profile of said laser to be measured.

2. A laser beam profiler according to claim 1 wherein said frequency modulated output signal providing means comprises:
    a photodetector means and means coupled to said photodetector means for compensating for a decrease in the amplitude of said envelope of said output signal as the absolute value of $\Delta l$ is increased from zero.

3. A laser beam profiler according to claim 1 comprising:
    means for moving said movable member in a substantially sinusoidal fashion toward and away from a predetermined position at which $\Delta l$ is zero such that said frequency modulated output signal comprises a frequency which increases as said movable member is moved toward said predetermined position and decreases as said movable member is moved away from said predetermined position; and wherein said frequency modulated output signal providing means comprises a photodetector means and means coupled to said photodetector means for compensating for a decrease in the amplitude of said envelope of said output signal as the absolute value of $\Delta l$ is increased from zero.

4. A laser beam profiler according to claim 3 wherein said compensating means comprises low pass filtering means and amplifying means having gain control means responsive thereto for providing a frequency modulated output signal having a substantially uniform amplitude.

5. A laser beam profiler according to claim 1 wherein said reflective means comprises a corner cube retroreflector.

6. A laser beam profiler according to claim 1 wherein said movable member is supported at each end by a rectangular spring member.

7. A laser beam profiler according to claim 6 wherein said spring member comprises a sheet of beryllium copper.

8. A laser beam profiler according to claim 7 wherein said sheet is approximately 0.004 inches thick.

9. A laser beam profiler according to claim 1 wherein said frequency modulated output signal comprises a frequency and envelope which varies as the velocity of the movable member varies and said means responsive to said profile and said frequency modulated output signals comprises compensating means for providing a corresponding output signal having an amplitude which decreases as said frequency increases and increases as said frequency decreases.

10. An laser beam profiler according to claim 9 wherein said compensating means comprises a transimpedance amplifier means having a variable gain which is responsive to the frequency of said frequency modulated output signal for producing said corresponding output signal having an amplitude which increases as said frequency of said frequency modulated output signal decreases and decreases as said frequency of said frequency modulated output signal increases.

11. An laser beam profiler according to claim 10 wherein said transimpedance amplifier means comprises a resistor and a capacitor coupled in parallel between an output and an input of said amplifier means, said resistor having a value of approximately 20K ohms and said capacitor having a value of approximately 1000 picofarads.

12. An optical beam profiler according to claim 3 wherein said moving means comprises means for providing a substantially sinusoidal driving force having a frequency of approximately 10 Hz.

13. An optical beam profiler comprising:
    a movable member on which is mounted a means for providing a first output signal as a function of the profile of an optical beam as said first output signal providing means is moved through said optical beam;

an interferometer incorporating a multimode diode laser, a reflective means rigidly attached to said movable member and a means responsive to radiation from said diode laser which is reflected from said reflective means as said movable member is moved for providing a second output signal as a function of the position of said movable member, said second output signal having a frequency and an envelope which varies as the velocity of the movable member varies; and compensating means responsive to said first and said second output signals for providing an output signal which corresponds to a selected measure of the profile of said optical beam and which has an amplitude which decreases as said frequency increase and increases as said frequency decreases.

14. An optical beam profiler according to claim 13 wherein said compensating means comprises a transimpedance amplifier means having a variable gain which is responsive to the frequency of said second output signal for producing said corresponding output signal having an amplitude which increases as said frequency of said second output signal decreases and decreases as said frequency of said second output signal increases.

15. An optical beam profiler according to claim 14 wherein said transimpedance amplifier means comprises an output and an input and a resistor and a capacitor coupled in parallel between said output and said input, said resistor having a value of approximately 20K ohms and said capacitor having a value of approximately 1000 picofarads.

16. A laser beam profiler according to claim 13 wherein said compensating means comprises low pass filtering means and amplifying means having gain control means responsive thereto for providing a frequency modulated output signal having a substantially uniform amplitude.

* * * * *

UNITED STATES PATENT AND TRADEMARK OFFICE
CERTIFICATE OF CORRECTION

PATENT NO. : 5,258,821

DATED : November 2, 1993

INVENTOR(S) : DAVID E. DOGGETT et al.

It is certified that error appears in the above-identified patent and that said Letters Patent is hereby corrected as shown below:

Column 7, line 37, change Δ to --"--.
Column 9, line 32, change "sign" to --signal--.

Signed and Sealed this

Nineteenth Day of April, 1994

Attest:

BRUCE LEHMAN

Attesting Officer

Commissioner of Patents and Trademarks